(12) United States Patent
Simpson et al.

(10) Patent No.: US 7,742,182 B2
(45) Date of Patent: Jun. 22, 2010

(54) SYSTEM AND METHOD OF IDENTIFYING A PRINTER OUTPUT TRAY

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2646 days.

(21) Appl. No.: 10/033,148

(22) Filed: Oct. 23, 2001

(65) Prior Publication Data

US 2003/0076527 A1 Apr. 24, 2003

(51) Int. Cl.
*G06F 3/12* (2006.01)
*G06F 15/00* (2006.01)

(52) U.S. Cl. ........ 358/1.15; 358/1.1
(58) Field of Classification Search ........ 358/1.1, 358/1.12, 1.13, 1.15, 402, 403, 1.6, 1.2, 1.4, 358/1.5, 1.9, 1.14, 1.16, 1.17, 1.18, 400, 358/401, 468, 407; 347/2, 3, 5, 14, 23; 399/1, 399/2, 8, 9, 12, 407; 271/3.01, 278, 279; 710/19, 15, 17, 18, 62, 64
See application file for complete search history.

(56) References Cited

U.S. PATENT DOCUMENTS 6,108,492 A 8/2000 Miyachi
6,433,884 B1 * 8/2002 Kawakami ........ 358/1.15
6,546,313 B2 * 4/2003 Nakahira et al. ........ 700/224
6,781,709 B2 * 8/2004 Nozawa ........ 358/1.12
2001/0022662 A1 9/2001 Hosoda

FOREIGN PATENT DOCUMENTS

DE 69611496 5/2001

OTHER PUBLICATIONS

U.S. Appl. No. 09/712,336, filed Nov. 13, 2000, Simpson et al.
U.S. Appl. No. 09/712,308, filed Nov. 13, 2000, Simpson et al.
U.S. Appl. No. 09/712,337, filed Nov. 13, 2000, Simpson et al.

* cited by examiner

*Primary Examiner*—Dov Popovici
(74) *Attorney, Agent, or Firm*—Matthew L. Wade (57) ABSTRACT

A printing system that includes a personal computer and a printer having multiple output trays. The printer operates both as a server and a printer. The printer serves a program to the personal computer upon request. The program enables the personal computer to print a document using the printer. The program also enables the personal computer to display an image of the printer while the printer is printing the document. The image indicates the printer output tray receiving the document. The image further indicates the present capacity of the output tray to receive additional media.

2 Claims, 7 Drawing Sheets

SYSTEM AND METHOD OF IDENTIFYING A PRINTER OUTPUT TRAY

BACKGROUND

Printers often include multiple output trays each capable of receiving a printed job. This can present a problem to a user who wishes to retrieve their job from the printer. For example, in some situations a user may not know which output tray has received his/her job. Furthermore, the printer may presently be holding multiple jobs in other output trays that belong to different users. In such a situation, it can be difficult for a user to locate his/her job in part because the user must differentiate his/her job from the other jobs.

Additionally, a user may send a job to a printer that exceeds the capacity of the printer's output tray to receive it. This can present a problem to the user, as he/she may not know when to walk over to the printer to remove printed media from the output tray in order to allow the rest of his/her job to print.

Accordingly, there is a need for an improved way for a user to identify the printer output tray that has received his/her print job. Furthermore, there is a need for an improved way to indicate to a user when his/her print job is about to exceed the capacity of the output tray receiving it.

SUMMARY

According to one embodiment, the invention provides a computer-implemented method. The method includes for example, transmitting a print job to a printer and displaying an indicator that indicates the identity of the printer output tray that receives the printed job.

According to another embodiment, the invention provides a server. The server may include, for example, apparatus for receiving a request from a client and apparatus for responding to the request by transmitting a program of computer readable instructions to the client. The program enables the client to:

i) use a specific printer having multiple output trays to print a document; and ii) display an indicator that indicates the identity of the output tray that is receiving the document.

According to another embodiment, the invention provides a computer readable medium embodying a program of instructions for causing a computer to perform method steps. The method steps may include, for example, displaying an indicator that identifies an output tray in a printer that is presently receiving a particular print job.

According to another embodiment, the invention provides a printer having a plurality of output trays. The printer may include, for example, apparatus for responding to a request received from a client by transmitting a program of computer readable instructions to the client. The program enables the client to: i) use the printer to print a document; and ii) while the printer is printing the document and discharging the printed document into an output tray, display an indicator that indicates the identity of the output tray.

Other aspects and advantages of the present invention will become apparent from the following detailed description, taken in conjunction with the accompanying drawings, illustrating by way of example the principles of the invention.

DESCRIPTION

Figure 1:
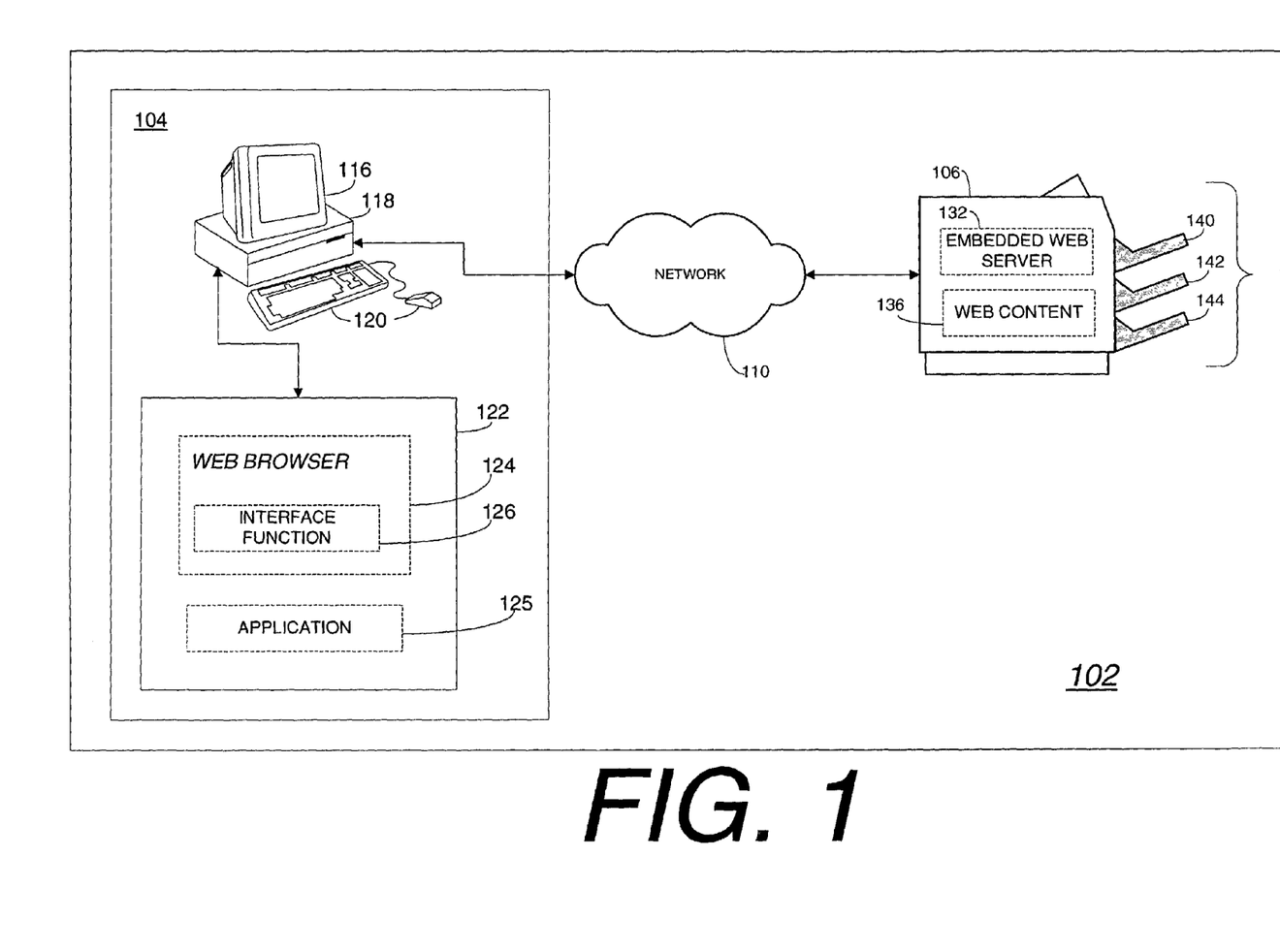
FIG. 1 is a block diagram of a computing system that incorporates an embodiment of the invention.

As shown in FIG. 1, for purposes of illustration, the invention is embodied in a novel computing system 102. The computing system 102 includes a personal computer (PC) 104 and a printer 106 all connected to a network 110. The network 110 may represent, for example, an intranet, a series of networks, the Public Internet, a wireless network(s), etc., or some combination thereof.

In this embodiment, the PC 104 runs a local operating system, such as a version of Windows or Windows NT. In order for a user to access the PC 104, the user first logs on. This involves the user establishing his/her online identity by inputting a user name and a password. For ease of discussion, a user presently logged into the PC 104 may be referred to as the "active user".

In the present embodiment, there exists a special classification of electronic documents. Documents that fall into this classification are referred to herein as "job documents". Each job document is linked to a unique user's online identity. A job document that is linked to a particular user's online identity may be referred to as being that user's "personal" job document. As will be seen below, the user's personal job document is the document that can be accessed by certain Web based services (such as the Web based printing service described below) when the user is presently the active user.

As shown, the PC 104 includes a display monitor 116, a processing unit 118, user input devices 120 and a memory 122. Stored in the memory 122 is a Web Browser 124 and a word processing application 125. The processing unit 118 can retrieve and execute these two applications upon receiving an appropriate request from the user. The Web Browser 124 enables the PC 104 to run "Web content" and to function as a Web client in the system 102. As used herein, the phrase "Web content" refers to a program of computer readable instructions that may be executed by a Web Browser. Thus, for example, Web content may be a set of instructions written in any of the following languages (the following is a non-exhaustive list): HTML, Java, JavaScript, C-Sharp code, etc.

The Web browser 124 includes a program interface function (PI function) 126. Web content running in the browser 124 can call the PI function 126 in order to access the active user's personal job document.

It is noted that the call to invoke the PI function 126 is device independent and is defined by a standard. For ease of discussion the call to invoke the PI function 126 may be referred to herein as the "get_job_doc" call. The standard that defines the call may be referred to herein as the "Web Imaging" standard.

To illustrate the operation of the PI function 126 consider the following example. Assume user "A" designates document "A" to be his/her personal job document. User "B" designates document "B" to be his/her personal job document. Under these conditions, when user "A" is the active user, Web content will access document A by calling the PI function 126. When, however, user "B" is the active user, Web content will access document "B" by calling the PI function 126. It should be noted that it is possible to have both users "A" and "B" access web content provided by the same web site.

Figure 2:
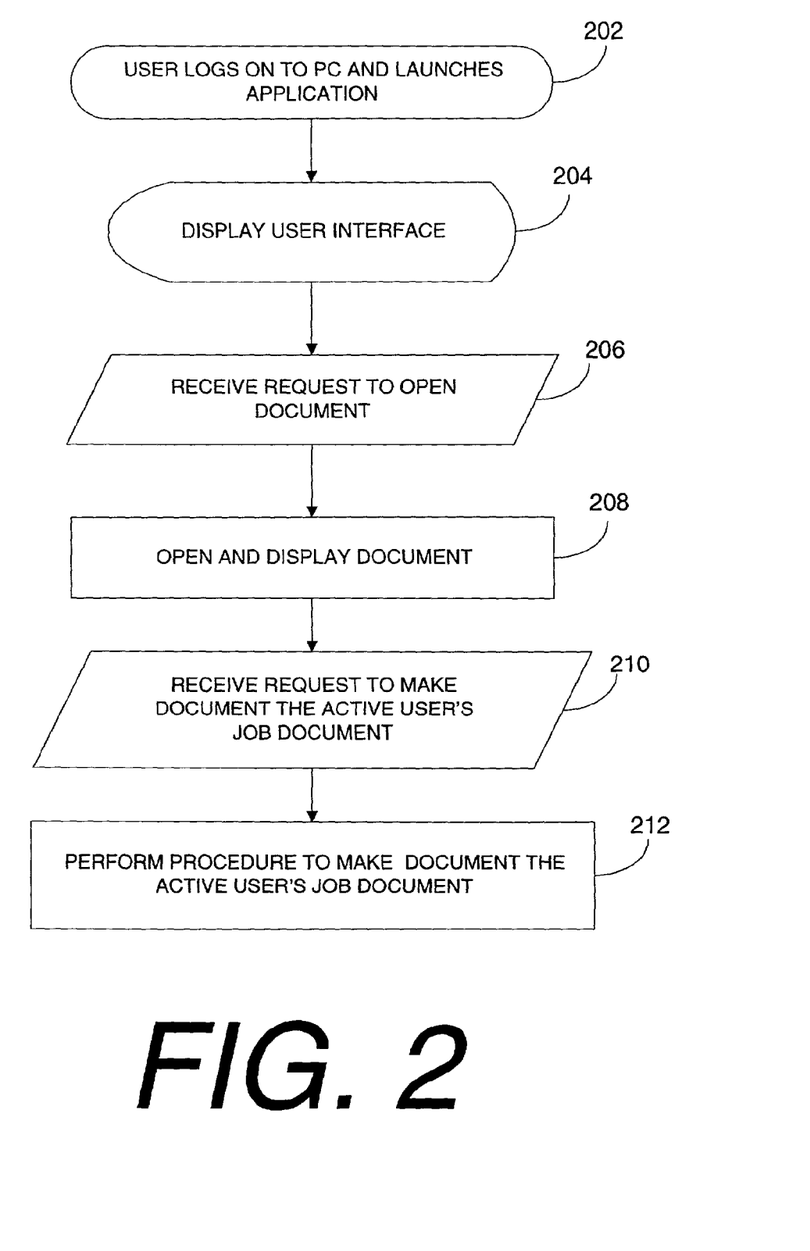
FIG. 2 is a flow diagram illustrating how a user of a PC in the system can create a job document.

It is noted that one way for a user to designate a document to be his/her personal job document is by use of the word processing application 125. FIG. 2 is a flow diagram illustrating this functionality.

Referring now to FIG. 2, a user is assumed to log on to the PC 104 and to then launch the application 125 (Step 202). Upon being launched, the application 125 operates to display an initial graphical user interface (step 204). The graphical user interface provides various menus and options. A user can interact with the graphical user interface to create a new document or open an existing document. The graphical user interface further allows a user to input a request to make the document, presently open in the application 125, the user's personal job document.

At step 206, the application 125 is assumed to receive a user request to open a particular document. At step 208, the application 125 responds to the request by opening and displaying the document.

At step 210, the user inputs a request to make the open document his/her personal job document. In response to this user request, the application 125 follows a pre-determined procedure to make the document the user's personal job document (step 212). This involves modifying information associated with the user that is stored on PC 104 (or in some other location) so that the PI function 126 (which has direct or indirect access to that information) will operate to link Web content to the document whenever the present user is the active user.

It is noted that certain aspects of the procedure followed in step 212 may be governed by the Web imaging standard mentioned above. This standard may specify the formatting of job documents. The standard, for example, may specify that all job documents are to be filed in a (portable document file) PDF format. Thus, step 212 may involve converting the document into a predetermined file format.

Other aspects of the procedure, however, may be governed by user preferences (e.g., the storage location of the job document). It is contemplated, for example, that the user may be given the option to store his/her personal job document locally or in a remote location.

Turning again to FIG. 1, the printer 106 includes a set of output trays 139. The set of output trays 139 includes an upper tray 140, a middle tray 142 and a lower tray 144. The printer 106 can output a printed job to any one of these three trays.

The printer 106 also includes an embedded Web server 132. The embedded Web server 132 can serve Web content 136 to Web clients, via the network 110, upon receiving an appropriate request. Multiple Web clients can access the Web content 136. In some implementations, the Web content 136 is generated dynamically. In other implementations, the Web content 136 is permanently stored in a local memory.

In general, the Web content 136 is intended to enable clients to print a document by using the printer 106. In this manner, the printer 106 provides a Web based printing service. The Web content 136 issues the "get_job_doc" call to access a document to print. Thus, the Web content 136 enables the PC 104 to print the active user's personal job document.

Figure 3:
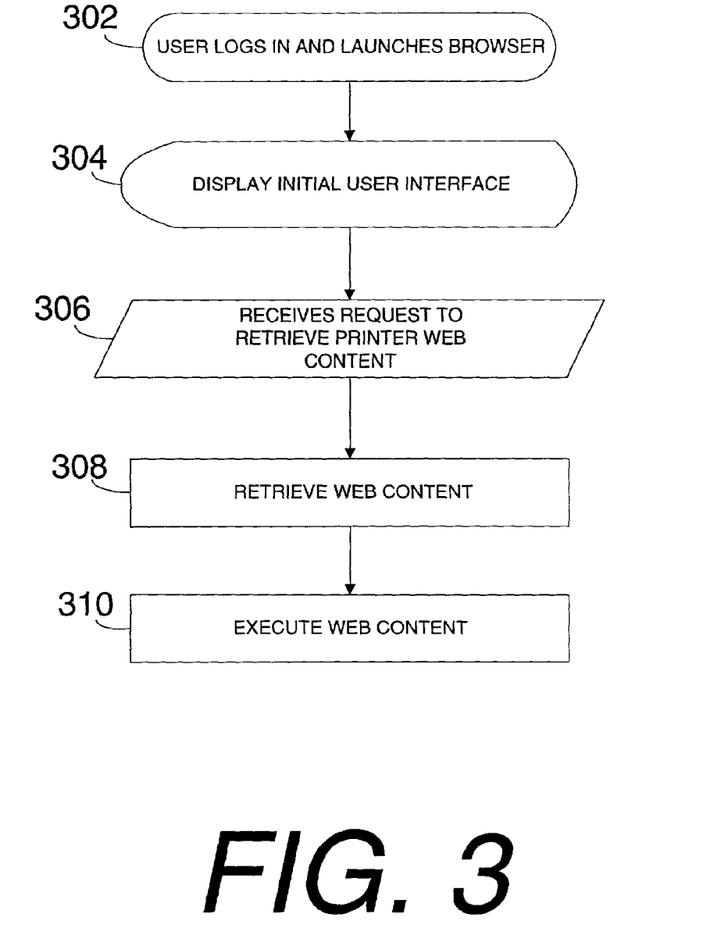
FIG. 3 is a flow diagram illustrating the operation of the PC to request and run Web content.
Figure 4A:
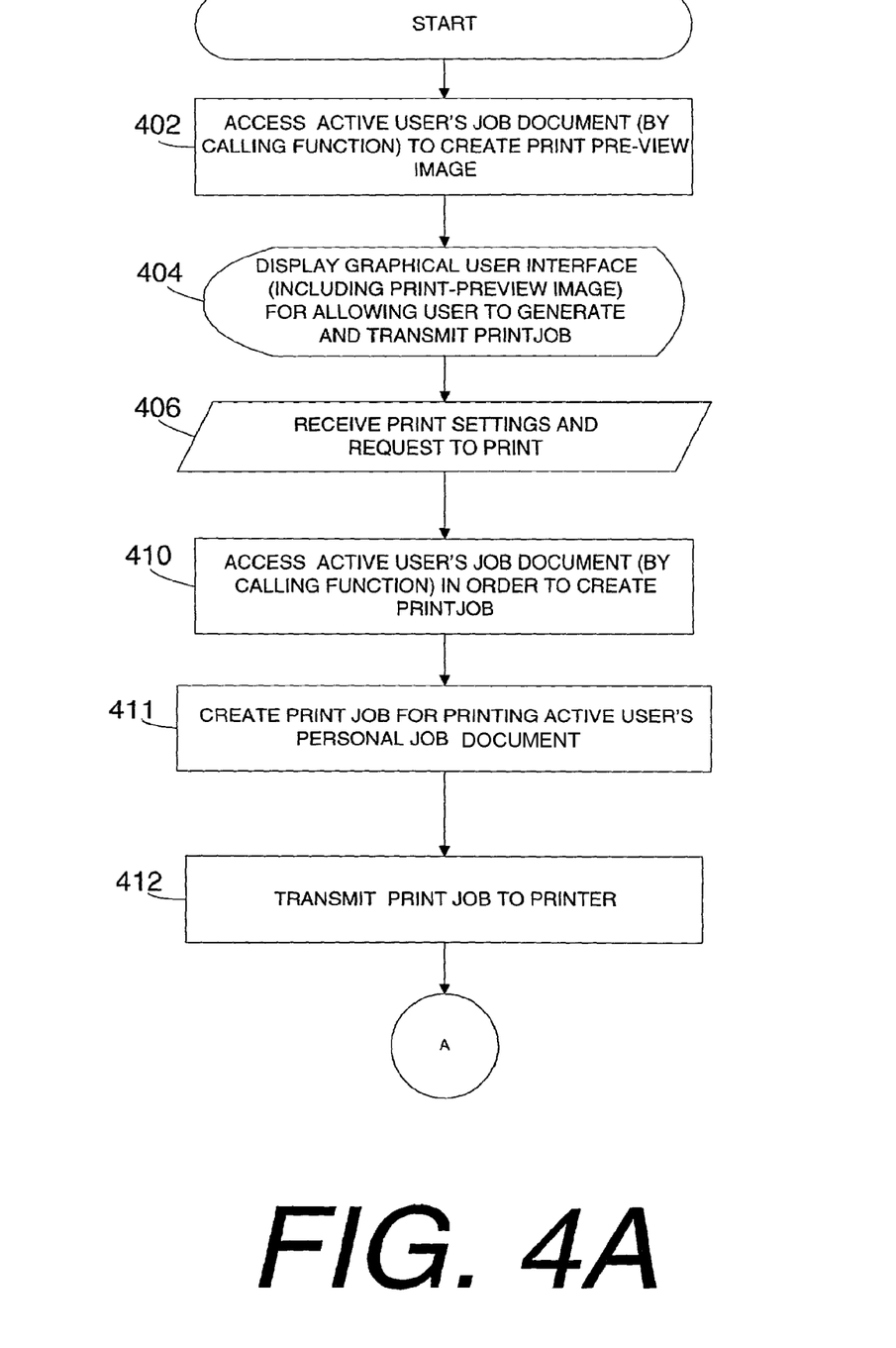
FIG. 4 is a flow diagram illustrating the operation of the PC under the direction of the Web content.
Figure 4B:
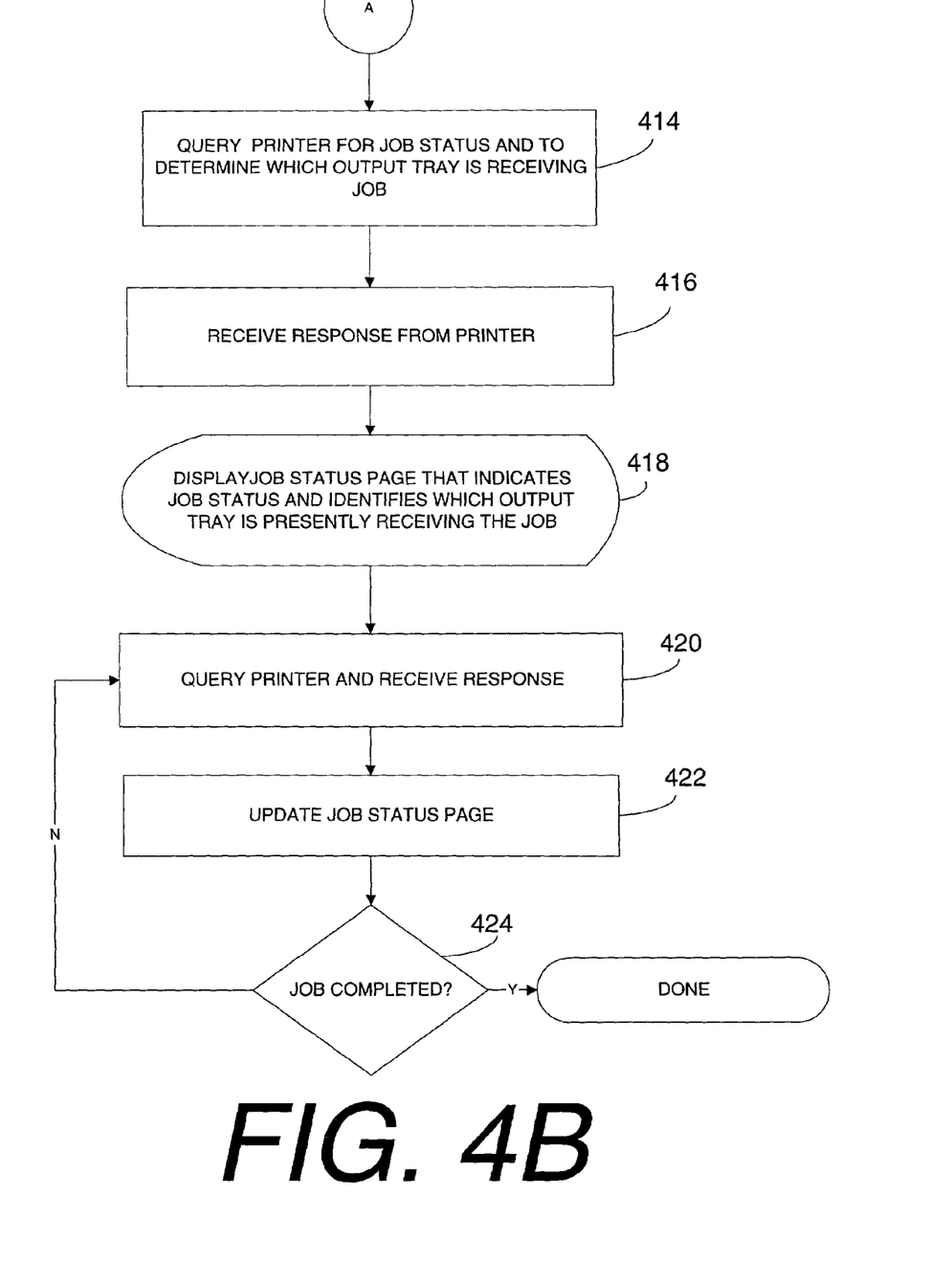
Figure 5:
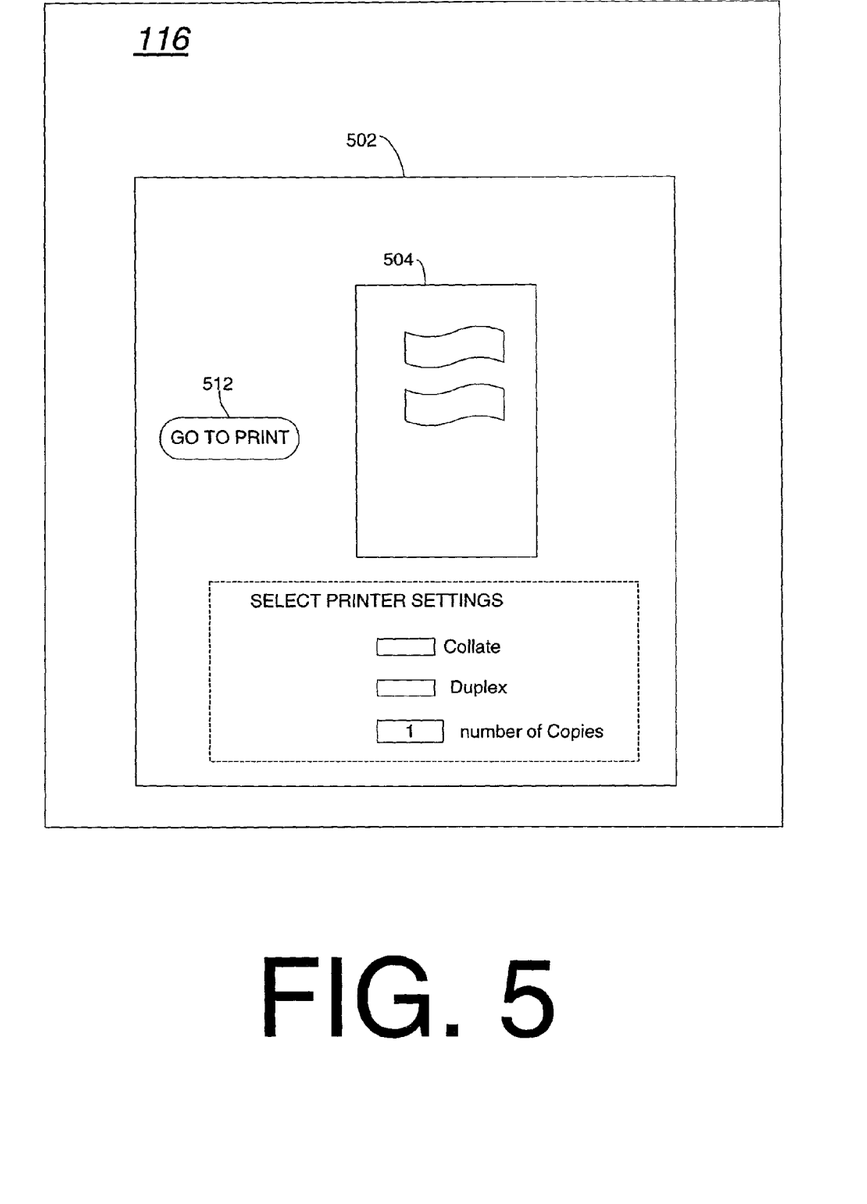
FIG. 5 provides an example of a GUI that may be displayed by the PC while operating under the direction of the Web content.

FIG. 3-5 are flow diagrams illustrating how a user of the PC 104 can make use of the printing service provided by the printer 106. It will be assumed in the following discussion that the user has previously selected a document to be his/her personal job document.

Turning first to FIG. 3, the user logs into the PC 104 and launches the Web Browser 124 (step 302). Upon being launched, the Web Browser 124 displays an initial graphical user interface (step 304).

The user can interact with the graphical user interface to request the Web content 136. The Browser 124 receives this user request at step 306. In response, the Browser 124 retrieves the Web content 136 by sending an appropriate request to the printer 106 (step 308). At step 310, the Web Browser 124 executes the Web content 136.

FIG. 4 is a flow diagram illustrating the operation of the Web content 136 at step 310. Turning now to FIG. 4, the Web content 136 accesses the active user's personal job document by calling the PI function 126 (step 402).

Next, the Web content 136 operates to display a graphical user interface (GUI) that allows the user to select various printing options that are offered by the printer 106 (step 404). Additionally, the GUI includes a print-preview image of the user's personal job document. The print-preview image is based upon the imaging information received at step 402.

FIG. 5 provides an example of a GUI 502 that may be displayed at step 404 assuming the printer 106 offers document collation, duplex printing and multi-copy printing. In this example, the GUI 502 is a single Web page. As shown, the GUI 502 also allows the user to select various print options. For example, the GUI 502 allows the user to select a document collation option and a duplex printing option. In addition, the user can enter the number of copies he/she wishes to print.

The GUI 502 also includes a print preview image 504. The print preview image 504 provides a visual representation of how the user's personal job document will be printed using the printer 106. The print preview image 504 is based upon the imaging information received at step 402.

After the user has set his/her desired print settings, the user can then request his/her personal job document be printed by selecting the "go to print" button 512.

Referring again to FIG. 4, it is assumed that the user interacts with the GUI displayed at step 404 in order to select his/her desired print settings and to request the active user's personal job document be printed. The PC 104 receives this user input at step 406.

In response to this user input, the Web content 136 accesses the user's personal job document again by calling the PI function 126 (step 410). The Web content 136 uses the imaging information received at step 410 to create a print job (step 411). The print job is suitable to print the user's personal job document according to the print settings received at step 406. The print job may or may not comprise the actual graphical data to be printed. In some circumstances the print job may instead contain references to the graphical data to be printed.

At step 412, the Web content 136 causes the print job to be transmitted to the printer 106 via the network 110. The printer 106 receives the print job, converts it into printed media and discharges the printed job (page by page) into one of the three output trays.

For ease of the following discussion, the print job that was transmitted at step 412 may be referred to herein as the "target job". The output tray presently receiving the target job may be referred to herein as the "target tray".

At step 414, the Web content 136 queries the printer 106 to determine the present status of the target job and to determine the identity of the target tray. At step 416, the PC 104 receives a response to the query. The response comprises the following information:

a) the identity of the target tray;
b) the total number of pages of the target job that have been printed; and
c) whether the printer has successfully printed the target job.

At step 418, the Web content 136 causes the computer 104 to display a Web page. This Web page will be referred to herein as the "job status" page. The job status page indicates the information received at step 416. In particular, the job status page indicates the identity of the target tray.

The Web content 136 continues to monitor the printer 106 on a periodic basis in order to determine the present status of the target job (step 420). As this information is received, the Web content 136 proceeds to update the job status page so as to provide the user the present status of the target job (step 422). The Web content 136 continues to monitor the printer 106 and to update the job status page until the target job is successfully completed (step 424). When the target job is successfully printed, the operation of the Web content 136 ends.

It should be understood that there are several alternate techniques for providing status using a web page including but not limited to reloading web content into the browser periodically, using a java applet (or some other type of executable content) to periodically query for status, or using a java applet to receive status events.

Figure 6:
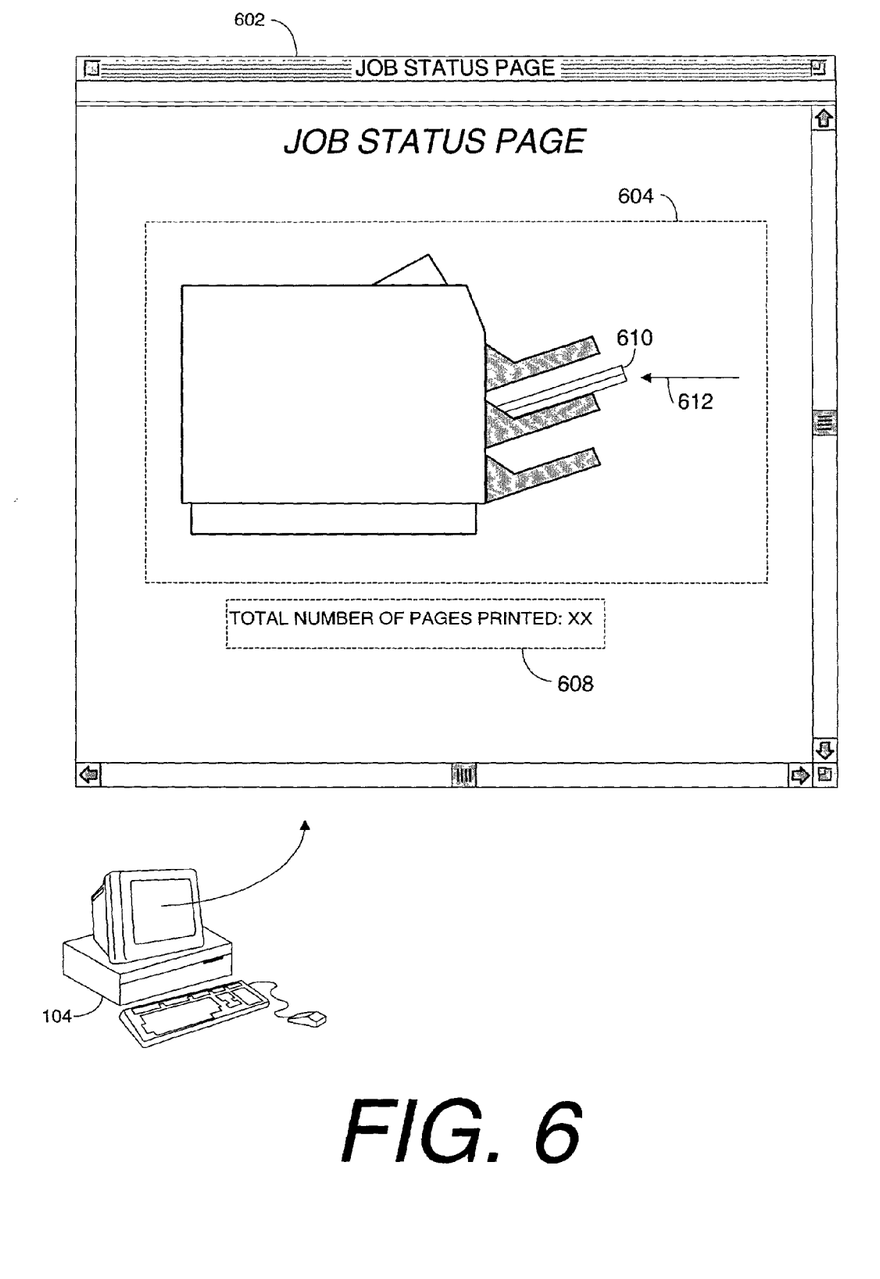
FIG. 6 is an example of a job status page that may be displayed by the PC while operating under the direction of the Web content.

FIG. 6 is an example of a job status page 602 that may be displayed at step 418 assuming the target tray is the middle tray 142. In general, the job status page 602 includes an image 604 and job status information 608. The job status information 608 indicates the total number of pages of the target job that have been printed.

The image 604 is an image of the printer 106 with a stack of printed media 610 in the target tray. The presence of the media stack 610 in the target tray provides a user with a visual indication that the tray presently receiving the target job is the middle tray 142. In this example, the image 604 also includes an arrow 612, which is pointing to the image of the middle tray 142. The arrow 610 is intended to provide a user with an additional visual indication that the middle tray 142 is presently receiving the target job. This visual indication is particularly useful in indicating which tray will receive output before any output has been received.

In some implementations, the printer image 604 is animated to visually convey certain information. For example, the printer image 604 may show printed media moving into the middle tray. This can provide the user with an indication that his/her job is presently printing.

It is noted that in other implementations, the job status page also indicates the present capacity of the target tray to receive additional printed media. There are a number of ways that the capacity of the target tray may be indicated. One way to convey this information graphically, for example, is by use of a color code.

For example, assume it is known that the target tray can hold a maximum of 100 sheets of printed media. According to one implementation the Web content 136 causes the image of the target tray to be displayed in a green color as long as the number of printed media placed in the target tray is below a first pre-determined number (e.g., 25 sheets). The color is then changed from green to yellow when the number of printed media placed in the target tray is above the first pre-determined number but below a second pre-determined number (e.g., 75 sheets).

When the number of sheets in the target tray goes over the second predetermined number, the color of the target tray image is changed from yellow to red. This alerts the user that the target tray is near the end of its capacity to receive additional media and the portion of the target job that has been printed so far should be removed.

It is noted that the Web imaging standard represents just one model that enables a user to designate a document that he/she wishes to be accessed by Web based services. There are other models that can be used that also provide a user with this capability. For example, the operation of the client to allow a user to make a job document and to link the job document to Web content may instead be performed by a remote server. According to one specific implementation, the remote server provides a user with a means for selecting a document to be his/her job document. Upon receiving the selection, the server operates to link the selected document to an identifier assigned to the user. This ID may be the user's login name and password. The ID is subsequently used to link Web content to the user-selected document. (This connection is performed at the server, rather than within the web browser as was described earlier.) For example, at run time the Web content may request the user to input his/her ID. Upon receiving this input, the Web content sends the user's ID to the server to obtain the document (i.e., the user's job document) that is linked to the user's ID. In this manner, therefore, the Web server is able to access the user's pre-selected job document and use that document to synthesize Web content based on that access.

It is important to also note that the present invention may be embodied in the form of a "computer readable medium". For example, a memory that stores (either temporarily or permanently) the Web content just described may be considered an embodiment of the invention. It is also noted that the phrase "computer readable medium" can refer to any medium that can contain, store or propagate computer readable instructions. Thus, in this context, computer readable medium may refer to a medium such as a CD ROM or to signals that are used to communicate the computer readable code over a network, such as the Public Internet. A computer readable medium may also refer to a carrier wave.

Although several specific embodiments of the invention have been described and illustrated, the invention is not to be limited to specific forms or arrangements of parts so described and illustrated. For example, the printer Web server described above may be provided by a remote server that is not embedded in the printer. Also, the Personal computer may alternatively represent a personal digital assistant (PDA). The invention is limited only by the claims and the equivalents thereof.

What is claimed is:

1. A server, comprising:

means for receiving a request from a client;

means for responding to the request by transmitting a program of computer readable instructions to the client, the program for enabling the client to:

use a specific printer having a plurality of output trays to print a document; and display an indicator that indicates the identity of an output tray from the plurality of output trays that receives the document and the present capacity of the output tray that is receiving the document to accept additional media;

wherein the server is the printer.

2. A printer having a plurality of output trays, comprising:

apparatus for responding to a request received from a client by transmitting a program of computer readable instructions to the client, the program for enabling the client to:

use the printer to print a document;

display an indicator that indicates an output tray from the plurality of output trays that receives the document; and inform a user of the present capacity of the output tray receiving the document.

* * * * *